3,824,254
METHOD OF PRODUCING Δ¹-TESTOLOLACTONE
Lev Natanovich Volovelsky, ulitsa Klochkovskaya 65, kv. 10, and Maya Yakovlevna Yakovleva, ulitsa Girshmana 19, kv. 44, both of Kharkov, U.S.S.R.
No Drawing. Filed July 17, 1972, Ser. No. 272,662
Int. Cl. C07d 7/06
U.S. Cl. 260—343.2 S     5 Claims

ABSTRACT OF THE DISCLOSURE

A method of producing Δ¹-testololactone resides in that Δ¹,⁴-androstadienedi-3,17-one is oxidized with hydrogen peroxide in an acetic acid medium, and the final product is isolated.

The thus-obtained Δ¹-testololactone finds application in medicine for treating of metastasizing mammary carcinoma.

---

The present invention relates generally to methods of producing steroids and has particular reference to a method of producing Δ¹-testololactone which finds application in medical practice for treatment of metastasizing mammary carcinoma without involving virilization or other manifestations of hormonal activity.

Known in the art is a method of producing Δ¹-testololactone, consisting in that dehydroepiandrosterone acetate is reduced with hydrogen in an alcohol solution over palladium catalyst to 5α-epiandrosterone acetate, the process being carried out at an atmospheric pressure and room temperature or at a pressure of 25–50 atm. and 50–70° C. in an autoclave.

When the reduction process is run at room temperature and atmospheric pressure it takes much time and requires highly diluted solutions; an alternative process runs faster and requires more highly concentrated solutions; however, the desired product obtained needs further oxidation. The yield of 5α-epiandrosterone acetate equals 50–90 wt. percent.

The 5α-epiandrosterone is oxidized with a 28-percent hydrogen peroxide in an acetic acid medium at 35° C. for 53 hours, the process being conducted in a temperature-controlled cabinet. Upon diluting the reaction mixture with water, epiandrololactone acetate is isolated therefrom which can be used for the next step without being purified. The yield of epiandrololactone acetate equals 80–90 wt. percent. The thus obtained epiandrololactone acetate is saponified while boiling with an alcoholic solution of caustic potash, whereupon an aqueous sulfuric acid solution is added until an acid reaction is obtained, the alcohol is distilled off and epiandrololactone is isolated from the resultant aqueous solution while cooling, the yield being equal to 88–91 wt. percent. The thus isolated epiandrololactone is oxidized to dihydrotestololactone with chromic acid in an acetone solution at 0° C. Upon reduction of excess chromic acid and separation of chromates, dihydrotestololactone is crystallized out from the acetone solution with a yield of 88 wt. percent, whereupon the isolated dihydrotestololactone is dehydrated with selenium dioxide in a solution of anhydrous tert-butanol while boiling within 72 hours in the presence of a variety of additives such as pyridine, some silver salts, etc. Upon separation of the reduced selenium, the solvent is distilled off, the residue is dissolved in ethyl acetate, the ethyl acetate solution is washed out by resorting to various methods, e.g., by washing with ammonium sulfide. The yield of Δ¹-testololactone at that stage equals 15–25 wt. percent and 10–12 wt. percent as calculated for the initial dehydroepiandrosterone acetate (cf. H. Lewy, R. P. Jacobson, J. Biol. Chem., 171, 71 (1947); L. N. Volovelsky, G. V. Knorozova, M. Y. Yakovleva, Zh. Or. Khim., 37 (6), 1252 (1967) (in Russian); L. Knox, R. Villoty, F. Kince, H. J. Ringold, J. Org. Chem., 26, 501 (1961); U.S. Pat. (kl. 260–397–45) 3,053,866; Ref. Zh. Khim. No. 7, 771,230r⎯⎯(1964) (in Russian); I. M. Nascimento, M. H. Vond, Rev. portug. farmag., 13, 472 (1963); ch. Meystre, H. Frey, W. Voser, Z. Wettstein, Helv. Chim. Acta, 39, 734 (1956)).

The known method is disadvantageous in being a multistage and lengthy one and having but low yield of the final product (10–12 wt. percent, as calculated for the initial dihydroepiandrosterone acetate).

Moreover, producing Δ¹-testololactone from dihydrotestololactone by dehydrating with selenium dioxide involves the formation of poisonous selenium-organic compounds, which renders purification of the final product more complicated.

It is an essential object of the present invention to enhance both the yield and quality of the final product.

It is another object of the present invention to simplify the technological features of the process and dispense with the use of poisonous compounds.

Said objects have been attained due to the fact that in a method of producing Δ¹-testololactone, according to the invention, Δ¹,⁴-androstadienedi-3,17-one is oxidized by hydrogen peroxide in an acetic acid medium, with subsequent isolation of the final product.

It is expedient for the oxidation process to take place at 30–40° C., a 25–30 percent hydrogen peroxide being used as an oxidant. To increase the yield the oxidation process is allowed to run for 36–50 hours. The isolation of the final product is preferably done by extracting it from the reaction mixture with benzene, washing the benzene extract with water, followed by distilling off benzene and recrystallizing Δ¹-testololactone first from acetone, then from ethyl acetate.

The method of the invention takes place according to the following diagram:

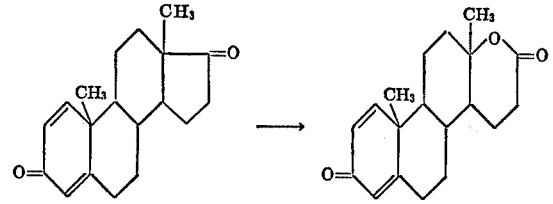

Δ¹,⁴-androstadienedi-3,17-one is dissolved in glacial acetic acid at room temperature, whereupon a hydrogen peroxide solution is added to the resultant acetic acid solution. It is preferable to make use of a 25–30 percent hydrogen peroxide solution for the purpose, though the use of a more diluted solution is likewise possible.

The thus obtained solution is placed in a temperature-controlled cabinet for 36–60 hours at 30–40° C. The process may be conducted within some other temperature ranges and time intervals. The aforesaaid process conditions are the optimum ones conducive to the highest possible yield of the final product. The resultant mixture is diluted with benzene, the benzene solution is washed with water to eliminate hydrogen peroxide and acetic acid, whereupon the solvent is distilled off. The extraction of Δ¹-testololactone from the reaction mixture can be carried out with some other hydrophobic solvents (ether, ethyl acetate, toluene, etc.). Benzene is the most convenient solvent due to its high dissolving power of the final product, ease of washing free from the reagents, good dehydrating ability and low boiling point. The isolated Δ¹-testololactone is crystallized from acetone, then from ethyl acetate. The yield of the final product equals 60–70 wt. percent of theory, as caluclated for the parent stock.

The proposed method is technologically simple and takes place in a single step. The yield of the final product is five times that obtained by the known method.

The proposed method makes it possible to dispense with the use of poisonous compounds and obtain a high quality final product that needs no further purification.

To promote understanding the present invention will now be disclosed in an exemplary embodiment thereof illustrating the method of producing $\Delta^1$-testololactone.

EXAMPLE 1

A solution of 6 g. of $\Delta^{1,4}$-androstadienedi-3,17-one in 60 ml. of glacial acetic acid was mixed with 36 ml. of a 28–30 percent hydrogen peroxide solution, the mixture being allowed to stand in a temperature-controlled cabinet for 53 hours at 37° C. Then the mixture was diluted with 0.5 liter of benzene and the benzene solution was washed four times with water. The washings were extracted three times with 250 ml. of benzene and the solvent was completely distilled off from the benzene extracts. Upon crystallization from 12–15 ml. of acetone, 3.7 g. of $\Delta^1$-testololactone were isolated, having a melting point within 206–209° C. After recrystallization from 11 ml. of ethyl acetate the yield of the final product was 3.4 g., its m.p. being within 212–214° C. In addition, another 0.5 g. of the final product having the same melting point, was isolated from the mother liquor remaining after crystallization.

Thus, 3.9 g. of the final product were obtained in total (65 wt. percent of theory).

What we claim is:

1. A method of producing $\Delta^1$-testololactone, comprising oxidizing $\Delta^{1,4}$-androstadienedi-3,17-one with hydrogen peroxide in an acetic acid medium, and isolating the final product.

2. A method as claimed in Claim 1, wherein the oxidation step is carried out at a temperature in the range of from 30–40° C.

3. A method as claimed in Claim 1, wherein a 25–30 percent hydrogen peroxide solution is used as an oxidant.

4. A method as claimed in Claim 1, wherein the oxidation step is carried out for a period of 36–60 hours.

5. A method as claimed in Claim 1, wherein the final product is isolated by extracting the reaction mixture with benzene, washing the benzene extract with water, distilling off benzene from said extract and recrystallizing $\Delta^1$-testololactone first from acetone, then from ethyl acetate.

References Cited

Anabrus et al.: *Experientia*, vol. 24, p. 432 (1968).
Segaloff et al.: *Cancer*, vol. 13, pp. 1017–1020 (1960).

JOHN M. FORD, Primary Examiner

U.S. Cl. X.R.
424—279